April 2, 1968  M. NOVAKOVICH ET AL  3,376,053
ROTATABLE HIGH PRESSURE FLUID FITTING
Filed Aug. 13, 1964
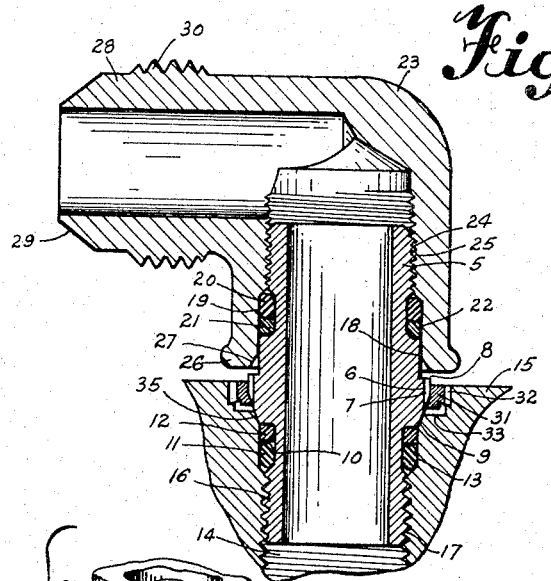
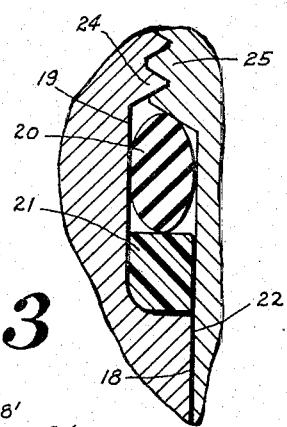
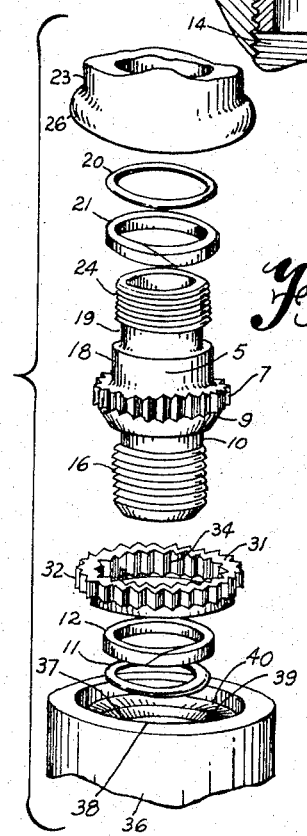
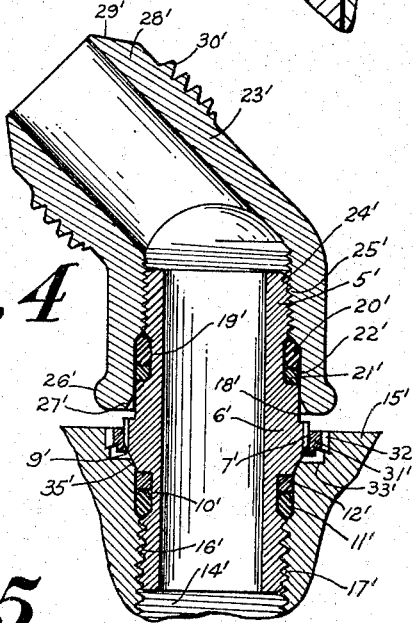
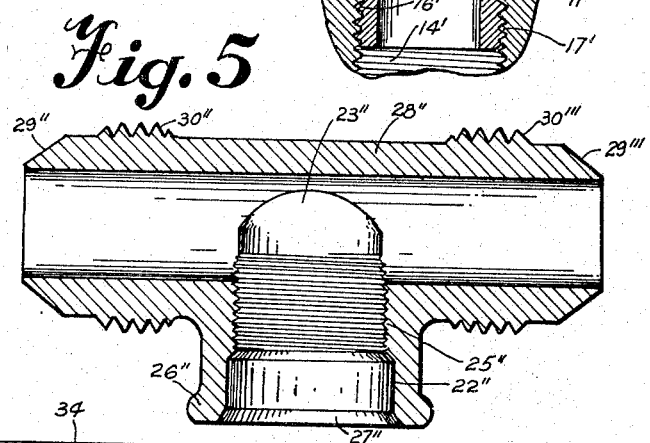
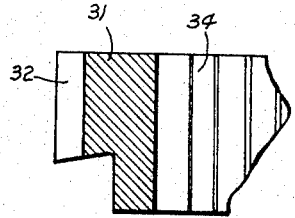
INVENTORS
ROBERT D. WEBER
MILAN NOVAKOVICH
ATTORNEY

United States Patent Office 3,376,053
Patented Apr. 2, 1968

3,376,053
ROTATABLE HIGH PRESSURE FLUID FITTING
Milan Novakovich, Balboa Island, and Robert D. Weber, Costa Mesa, Calif., assignors to Rosan Engineering Corp., Newport Beach, Calif., a corporation of California
Filed Aug. 13, 1964, Ser. No. 389,362
3 Claims. (Cl. 285—92)

This invention relates to fluid fittings, and particularly to an improvement in fittings for high pressure fluid lines.

In the field of fluid flow, it is necessary to utilize a plurality of fittings which may be secured to various types of equipment, and to which flexible or rigid high pressure conduits may be attached.

Such fittings may require repeated assembly and disassembly during the process of maintaining the equipment with which they are associated.

Examples of the service to which such fluid fittings are adapted may be found in the aircraft industry, where it is necessary to conduct fluids at high pressure to a number of parts of the plane to operate the landing gear, the wing flaps, adjust the pitch of the propellers, and to actuate other important portions of the plane's equipment.

Currently, attention has been focused on this field because of numerous malfunctions of landing gear equipment. When an airplane is landing, the stresses involved may be very substantial, since in addition to the dead weight of the plane, there are dynamic stresses due to the fast moving mass. This is particularly true as the size of the airplane is increased. Since many of these large size aircraft, both civilian and military, land at high speeds, a number of landings have, due to landing gear malfunction, resulted in the complete destruction of the plane and passengers. Therefore, the importance which the fluid fittings and system play in the functioning of the aircraft is obvious.

One of the defects in existing fluid fittings has been a tendency for them to become loosened due to vibration of the part to which they are installed. Such loosening may cause a leakage at a joint, and a resulting failure of the fluid system at critical moments.

Another problem existing in present day high pressure fluid fittings is that connections to the fittings can only be installed in a preset or prefixed position without having a leaking fitting. Still another problem is that of weight reduction necessary in the design and operation of space vehicles and the like.

The present invention provides, therefore, not only a fitting which cannot loosen accidentally or through vibration, but also one which will insure a positive seal of the fluid system at any pressure which may be encountered and at any radial position required to attach a connecting member. In addition, the present invention provides a fitting having not only an improved performance, but a fraction of the weight, of equivalent standard fittings.

Therefore, an object of this invention is to provide a high pressure fluid fitting, wherein connecting lines may be attached at any radial position without leakage.

Still another object is to provide high pressure fluid fittings which are secured so as to prevent loosening thereof, due to vibration, and yet may be readily disassembled.

A still further object is to provide high pressure fluid fittings which may utilize conventional O-ring seals to assist in retaining fluid pressure, yet capable of having connecting line fittings attached in any radial position.

A further object is to provide an alternative form of all metal seal to retain high fluid pressures.

Another object is to provide a high pressure fluid fitting which is of less size and weight than conventional fittings, without sacrificing strength or performance of the fitting.

These and other objects will be readily apparent from the following description taken in conjunction with the accompanying drawings, in which:

FIG. 1 is a vertical sectional view of a high pressure fluid fitting embodying the principles of the invention, showing the fitting completely installed in the bore of the workpiece;

FIG. 2 is a perspective view, illustrating in vertical alignment the fitting of FIG. 1 and a boss adapted to receive same;

FIG. 3 is a greatly enlarged, fragmentary, sectional view of the cavity formed by the annular groove provided by the stud and the smooth wall portion carried by the head.

FIG. 4 is a vertical sectional view, illustrating another embodiment of the invention, showing an angled rotatable head;

FIG. 5 is a vertical sectional view, showing another embodiment of a rotatable head which is adapted to be substituted for the rotatable head illustrated in FIGS. 1 and 3;

FIG. 6 is a greatly enlarged, fragmentary, sectional view of the locking ring of FIGS. 1, 2 and 4.

Referring more particularly to FIG. 1, the fitting of the invention consists of a tubular stud 5, having an external outwardly projecting radial flange 6, which is provided with a plurality of longitudinally extending peripheral serrations 7. One surface of the flange is normal to the axis of the stud 5 and forms a shoulder 8. The peripheral face of flange 6 has a tapered portion 9 which is devoid of serrations. Stud 5 has an annular groove 10, which is adapted to accommodate an O-ring seal 11 and a back-up ring 12. The maximum radial depth of the groove 10 must be such that the O-ring seal 11 is tightly accommodated between the bottom wall of groove 10 and the unthreaded smooth side wall 13 of bore 14 of workpiece 15. Back-up ring 12 serves the function of preventing leakage of the fitting upon installation in the event the O-ring seal 11 becomes deformed when the parts of the fitting are tightened during installation. Nevertheless, the fitting of the present invention is capable of functioning without back-up ring 12.

Stud 5 is provided with threads 16, which are used to secure the body to threads 17 of bore 14, and a smooth body portion 18 above shoulder portion 8 of flange 6. Immediately above smooth body portion 18, stud 5 is provided with a second annular groove 19, which is adapted to accommodate a second O-ring seal 20 and a second back-up ring 21. O-ring seal 20 and back-up ring 21 serve exactly the same function as do O-ring seal 11 and back-up ring 12, respectively. The radial depth of annular groove 19 is also dimensioned so that a tight fit exists between O-ring seal 20 and back-up ring 21, with the smooth inner wall 22 of the rotatable head 23, and the bottom wall of groove 19. As was the case with back-up ring 12, the fitting is capable of functioning without back-up ring 21.

Stud 5 is provided with external threads 24 which are adapted to engage internal threads 25 of head 23. It should be noted that external threads 24 are "extra-fine" and have a smaller pitch than the threads 16 of stud 5. "Extra-fine" threads 24 are required so that when head 23 is rotated in a plane normal to the axis of stud 5, the axial displacement of head 23 relative to stud 5 is only of the order of 0.031" in one complete 360° turn. It has been found that axial displacement of head 23 resulting from a rotation thereof through more than two thread convolutions (or more than two complete turns of 360°) will result in a leakage of the fluid along the interfaces of the thread convolutions of the fitting.

This difference of thread size also insures proper installation of the fitting by preventing an insertion of the wrong end of stud 5 into bore 14 of workpiece 15.

It should be noted that in each case, back-up rings 12 and 21 are on the side of O-ring seals 11 and 20, away from the threaded portions 24 and 16, respectively. These rings are positioned so as to place the O-ring seal circumscribing stud 5 immediately adjacent the threaded junctions of said stud 5 with the workpiece bore 14 and head 23, respectively, since it is at the threaded junctions that leakage will occur due to the fluid passing along the interfaces of the thread convolutions. It should also be noted that smooth wall portion 22 of head 23 has an internal diameter such that O-ring seal 20 and back-up ring 21 are tightly accommodated between wall portion 22 and the bottom wall of annular groove 19.

It should also be noted that smooth body portion 18 of stud 5 and smooth wall portion 22 carried by head 23 have a very close tolerance fit therebetween, so as to permit rotatable motion of head 23, yet provide as close an engagement as possible between the smooth portion 18 and smooth wall 22. This is important to insure that back-up ring 21 is not driven between the faces of smooth portion 18 and smooth wall 22 of stud 5 and head 23, respectively, thereby resulting in eventual leakage of the fluid.

Head 23 is provided with reinforced end portion 26 to prevent radial "flare-out" or "splitting" of the portion of the head adjacent the smooth body portion 18 of stud 5. Thus, expansion of head 23 is prohibited in that area and leakage of fluid resulting from pressure of the fluid system through that junction is prevented.

Reinforced portion 26 of head 23 is provided with an annular beveled face 27. This beveled face is provided so that upon the installation of head 23 to stud 5, the reinforced portion is guided over O-ring seal 20. Reinforced head portion 26 is initially seated upon annular shoulder 8 provided by flange 6, so that said shoulder 8 acts as a stop for said reinforced portion 26. When head 23 is fully threaded so as to seat reinforced portion 26 on said shoulder 8, head 23 is then "backed-off" slightly, thereby placing head 23 in its operative position, i.e., capable of freely rotating in a plane normal to the axis of stud 5.

The embodiment of head 23, as illustrated in FIG. 1, is substantially tubular and has at least a portion 28 of the head normal to the axis of stud 5. Said portion 28 is provided with a tapered portion 29 and external threads 30 which are adapted to have secured thereon a connecting coupling or the like.

A locking ring 31 is provided with a plurality of external serrations 32 around the outer periphery thereof which are adapted to be embedded into the workpiece in the area immediately adjacent the counterbore 33 of bore 14 in workpiece 15. Ring 31 is further provided with a plurality of longitudinal internal serrations 34, best illustrated in FIG. 2 and which are adapted to interfit with external serrations 7 carried by flange 6. After ring 31 is embedded into counterbore 33, stud 5 is positively locked against rotation relative to workpiece 15. Nevertheless, head 23 is free to rotate in a plane normal to the axis of stud 5.

It can therefore be seen that the invention provides a fluid fitting which is positively locked against loosening due to vibration and the like, and yet is capable of rotating so as to adjust to any radial position relative to the axis of stud 5. This is a very decided and novel improvement over conventional universal fittings, since once the conventional universal fitting is installed, it is fixed in a given radial direction. When another radial direction is reqiured, the fitting has to be realigned by disassembling and reassembling the fitting.

When installing the fitting, beveled portion 35 of bore 14 is adapted to receive tapered portion 9 in very tight association therewith. This arrangement is important to prevent lateral movement or "wobbling" of stud 5, thereby eliminating the possibility of fluid leakage.

The length of stud 5, which is accommodated within head 23, is such that even when reinforced portion 26 of head 23 is seated against shoulder 8, said stud does not extend into the tubular cavity of head 23 which is normal to the axis of stud 5 so as to restrict the flow of fluid through the cavities of both the head and stud, or cause turbulence in the flow of the fluid therethrough.

The bore in the workpiece into which this fitting is installed is threaded at 17 for a portion of its length and has a smooth side wall 13 immediately adjacent said threaded portion. Immediately joining said smooth side wall 13 and opposite from the threaded portion 17, bore 14 has, as aforesaid, a beveled portion 35. Interconnecting said beveled portion 35 and the surface of workpiece 15 is a flat-faced counterbore 33. Thus, when the fitting of FIG. 1 is installed, back-up ring 12 and O-ring seal 11 are pressed over threads 16 of stud 5 so as to be accommodated in annual groove 10 of said body. Threads 16 of stud 5 are subsequently threaded into bore 14 until tapered portion 9 carried by flange 6 of stud 5 is in tight engagement with beveled portion 35 of bore 14. As a consequence of fully seating tapered portion 9 of flange 6 against beveled portion 35 of bore 14, O-ring seal 11 and back-up ring 12 are snugly confined in tight leak-prof association in the cavity formed by annular groove 10 and the unthreaded smooth side wall 13 of bore 14. Thus, a seal against leakage is provided not only by the O-ring, but also by the metallic contact between the tapered portion 9 of flange 6 and beveled portion 35 of bore 14.

Locking ring 31 is inserted over the portion of stud 5 having the extra-fine threads 24, until internal serrations 34 of said ring (as best seen in FIGS. 2 and 6) are in engagement with external serrations 7 of flange 6 and said external serrations 32 thereof are seated against the surface of workpiece 15. The locking ring, which has its internal serrations 34 in engagement with the peripheral serrations 7 carried by flange 6 of stud 5, is then axially displaced into the flat-faced counterbore 33 of bore 14. The external serrations 32 carried by locking ring 31 are thus embedded in the workpiece 15, thereby locking stud 5 against rotation relative to said workpiece.

After the locking ring 31 has been driven into the surface of workpiece 15, back-up ring 21 and O-ring seal 20 are inserted, in that order, over the opposite end of stud 5, so that said back-up ring 21 and O-ring 20 are accommodated in annular groove 19. Bevel 27 facilitates passing the end of head 23 over O-ring 20 and back-up ring 21 as head 23 is positioned to engage the extra-fine threads 23 of stud 5. Head 24 is then threaded onto threaded portion 24 of stud 5, as aforesaid, until reinforced portion 26 is fully seated against shoulder 8 provided by flange 6. Head 23 is then rotated in a direction opposite the threading direction so as to slightly "back-off" reinforced portion 26 from stop shoulder 8. Thus, head 23 will not bind against said shoulder 8 when head 23 is rotated in a plane normal to the axis of stud 5. It should be noted that after head 23 is "backed-off" from seat 8, the end of stud 5 does not project into the cavity of head 23 having its axis in a plane normal to the axis of stud 5. As indicated previously, head 23 is capable of being "backed-off" approximately two complete convolutions. The thread pitch attendant to the extra-fine threads permits an axial displacement of head 23 relative to stud 5 in the order of 0.031″ per thread convolution. Consequently, the possibility of fluid leakage along the convolutions of the threads is minimized. Smooth wall portion 22 of head 23 is then in very close association with smooth body portion 18 of stud 5. In addition, O-ring seal 20 and back-up ring 21 are tightly confined within the cavity formed by annular groove 19 provided by stud 5 and smooth wall portion 22 carried by head 23. It will be noted that O-ring seal 20, as was the case with O-ring seal 11, is positioned on the side of the back-up ring adjacent the threaded engagement between stud 5, head 23 and workpiece 15, respectively, so as to provide the seal at the point most probable to leak.

After stud 5 is fully installed in workpiece 15, shoulder 8 carried by flange 6 of stud 5 protrudes slightly above locking ring 31 after said locking ring is fully embedded into counterbore 33 of bore 14. If seat 8 does not extend above the face of locking ring 31 after installation, then upon the threading of head 23, reinforced portion 26 would stop against the face of locking ring 31 rather than shoulder 8. Therefore, since an insufficient amount of smooth portion 18 and smooth wall 22 of stud 5 and head 23, respectively, would be in engagement, and also since annular groove 19 provided by stud 5 would be misaligned with the smooth wall portion 22 of head 23, a positive sealing action by O-ring seal 20 in conjunction with back-up ring 21 as well as between smooth portion 18 and smooth wall 22, would not occur. Thus, this allows head 23 to be threaded upon stud 5 to an exact predetermined position, so that all the features of the fitting herein which provide a tight seal against leakage are correlated to simultaneously perform their function in providing a leak-proof rotatable fitting.

FIG. 2 is a perspective view illustrating in vertical alignment the fitting of FIG. 1. As illustrated in FIG. 2, a boss 36 rather than workpiece 15 is drilled and tapped to form bore 37. As was the case with bore 14 in workpiece 15, bore 37 of boss 36 is further provided with a nonthreaded portion 38, a beveled portion 39 adjacent thereto, and a flat-bottomed counterbore 40.

FIG. 3 more clearly illustrates the positions of back-up ring 21 and O-ring seal 20 relative to the threaded engagement between threads 24 and 25 of stud 5 and head 23, respectively. In addition, FIG. 3 illustrates a close association between smooth portion 18 of stud 5 and smooth wall portion 22 carried by head 23.

FIG. 4 illustrates another embodiment of the fitting of the present invention having a rotatable head 23'. Since all the other features of the embodiment of FIG. 4 are similar to those shown in the embodiment of FIG. 1, similar reference numerals are used, but carry a prime designation.

FIG. 5 is another embodiment of a rotatable head capable of being utilized in conjunction with either stud 5 of FIG. 1 or stud 5' of FIG. 3. Head 23" of FIG. 5 is provided with extra-fine internal threads 25", internal smooth wall portion 22" and bevel 27". Head 23" is further provided with reinforced portion 26" which is adapted to be seated against shoulder 8 or 8' of FIGS. 1 and 4, respectively. Thus, head 23" when utilized in conjunction with either stud 5 or 5' of FIG. 1 or FIG. 4, respectively, has a portion 28" which would be normal to the axis of said bodies. Portion 28" is provided with tapered ends 29" and 29"', respectively. In addition, portion 28" of head 23" is provided with external threads 30" and 30"' which are adapted to have a connecting coupling or the like secured thereon.

An enlarged sectional view of the locking ring 31 is illustrated in FIG. 6 showing the external and internal serrations 32 and 34, respectively.

While several embodiments of the invention and the method of use thereof have been described, it is, of course, understood that the particular embodiments of the invention herein disclosed are for illustrative purposes only and that various changes may be made therein without departing from the principles of the invention or the scope of the annexed claims.

We claim:

1. In combination, a work piece having a threaded bore with a counterbore at its upper end and including an upwardly and radially outwardly inclined bottom wall between said bore and counterbore and a smooth circumferential wall surface adjacent said inclined bottom wall; and an insert, comprising:

a tubular stud having external threads engaged with the threads of said bore, a first annular groove provided in said stud, said groove positioned so as to be opposite said smooth wall portion of said bore after fully threading said stud into said bore;

an integral radial flange projecting outwardly from said stud, said flange having a portion of the peripheral face thereof beveled and the remaining portion of said peripheral face provided with longitudinal serrations, said beveled portion of said flange face having a circumferentially continuous sealing surface thereon and said sealing surface being seated in tight sealing engagement with said inclined bottom wall of said bore;

an externally and internally serrated locking ring received in said counterbore, said internal serrations being in engagement with the external serrations of said stud flange, said external serrations of said locking ring being pressed into the workpiece adjacent said counterbore, so as to lock said stud from rotational movement relative to said workpiece, said stud being provided with a smooth wall portion and a second annular groove on the opposite side of the flange from said first annular groove, second threads situated on said stud on the opposite side of the flange from first threads, said second threads having a thread pitch less than the thread pitch of said first threads;

a head rotatably mounted on said stud, a smooth circumferential wall portion extending inwardly from one end thereof, said head being provided with internal threads adjacent said wall portion engageable with said second threads of said stud, the said wall portion of said head extending over and beyond the second annular groove of said stud after said head is in threaded engagement with said stud, said head having the axis of a portion thereof in a plane on an angle relative to the axis of said stud; and sealing means positioned in said first and said second annular grooves, respectively.

2. The combination defined in claim 1, wherein the end of the head which is rotatably secured to said stud is counterbored to a depth whereby the counter bore wall is rotatably engaged with the smooth wall portion of the stud after said head is fully threaded onto said stud, and wherein reinforced means are positioned on the end of said head to prevent flaring out or splitting of said end.

3. The combination defined in claim 1, wherein the end of the head which is rotatably secured to said stud is counterbored to a depth whereby the counterbore wall is rotatably engaged with the smooth wall portion of the stud after said head is fully threaded onto said stud, the sealing means are comprised of O-ring seals, and wherein reinforcement means are positioned on the end of said head to prevent flaring out or splitting of said end.

References Cited

UNITED STATES PATENTS

| | | | |
|---|---|---|---|
| 2,599,389 | 6/1952 | Hume | 285—351 X |
| 2,062,145 | 11/1936 | Pickup | 285—179 X |
| 1,925,937 | 9/1933 | Schultis | 285—89 |
| 2,026,954 | 1/1936 | Van Dusen | 285—355 |
| 2,413,878 | 1/1947 | Maky | 285—220 |
| 2,452,262 | 10/1948 | Rosan | 285—92 |
| 2,481,404 | 10/1949 | Donner | 285—321 |
| 2,607,446 | 8/1952 | Rosan | 151—41.73 |
| 2,676,037 | 4/1954 | Mueller | 285—219 |

CARL W. TOMLIN, *Primary Examiner.*

T. A. LISLE, DAVE W. AROLA, *Assistant Examiners.*